: 3,635,908
Patented Jan. 18, 1972

3,635,908
PROCESS OF PREPARING POLYURETHANE-UREA THERMOPLASTIC PRODUCTS BASED ON A POLYAMINE CARBAMATE AS CHAIN EXTENDER
Herwart C. Vogt, Grosse Ile, and George Roley, Trenton, Mich., assignors to BASF Wyandotte Corporation, Wyandotte, Mich.
No Drawing. Continuation of application Ser. No. 661,818, Aug. 21, 1967. This application Nov. 10, 1969, Ser. No. 875,519
Int. Cl. C08g 22/16, 53/16
U.S. Cl. 260—77.5 AA    4 Claims

ABSTRACT OF THE DISCLOSURE

The subject matter of the present application relates to polyurethane- urea compositions. As disclosed herein, the polyurethane-urea compositions are prepared by heating a composition which comprises (a) polyamine carbamate and either (b) organic polyisocyanate and (c) organic compound containing at least two active hydroxyl groups or (d) isocyanate-terminated intermediate prepared by the reaction of (b) and (c). The polyamine carbamate employed in these compositions acts as a chain-extending agent and may act as a foaming or blowing agent, thereby providing for unitary compositions for preparation of polyurethane-ureas which are stable at room temperature.

This application is a continuation of copending U.S. Patent application Ser. No. 661,818, filed Aug. 21, 1967, now abandoned.

In general, the art has developed various methods of manufacturing polyurethane foams. The preparation of polyurethanes is disclosed in many references, including the texts entitled "Polyurethanes" by Bernard A. Dombrow, published by Reinhold Publishing Corporation, New York, N.Y., 1957, and "Polyurethanes: Chemistry and Technology" by J. H. Saunders and K. C. Frisch, published by Interscience Publishers, New York-London, wherein disclosures are made of methods for producing polyurethanes.

The preparation of polyurethane-ureas from organic compounds having at least two active hydroxyl groups, organic polyisocyanates, and polyamines is known in the art. It is also known to include a blowing or foaming agent in such composition where a foam is desired. However, the reaction between the isocyanate group and the amine group proceeds considerably more rapidly than does the reaction between the hydroxyl group and the isocyanate group. Because of the above, it has generally been considered necessary to prepare an isocyanate-terminated prepolymer from the polyisocyanate and hydroxyl group containing organic compound and prevent contact of the prepolymer and polyamine until immediately before the reaction between the prepolymer and polyamine. This has required separate packaging of prepolymer and polyamine. This practice has certain inherent disadvantages from the standpoint of efficient packaging and storage of these materials as well as convenience in use. Accordingly, various procedures have been proposed to retard the amine-isocyanate reaction in an attempt to prepare unitary compositions for polyurethane-ureas. The most commonly proposed procedure relates to the blocking of the isocyanate groups. This procedure is not totally satisfactory, however, since it creates another problem, that is, how to unblock the blocked isocyanate groups. In addition to the problems associated with the reactivity of the amine and isocyanate groups, other problems result when it is desired to prepare unitary foamable polyurethane-urea compositions since standard foaming or blowing agents, such as water and halogenated hydrocarbon, cannot be added to the composition prior to the time when the reaction is to proceed. Because of these problems, it has not heretofore, to applicants' knowledge, been possible to combine all essential ingredients of a polyurethane-urea foam into a unitary system which is stable at room temperature.

Accordingly, it is a purpose of the present invention to provide a novel, unitary composition for the preparation of polyurethane-ureas which is stable at room temperature and which composition may be foamable.

The above and other purposes are accomplished in accordance with the present invention by a composition of matter comprising:

(A)

(1) (a) Organic polyisocyanate and
 (b) Organic compound containing at least two active hydroxyl groups, the amounts of (a) and (b) being such that the NCO/OH ratio of the compositions is greater than one or
(2) Isocyanate-terminated intermediate prepared by the reaction of (a) and (b) and (B)

Polyamine carbamate.

The compositions of the present invention are stable at room temperature. They may be readily activated by heating preferably at a temperature of about 80 to 150° C. which decomposes the carbamate to release carbon dioxide, which acts as a foaming or blowing agent, and free polyamine which then reacts with the isocyanate groups.

Also, the above composition may be employed for forming thermoplastic polyurethane-ureas. More particularly, mass polymerization of urethane plastics can be achieved continuously in equipment such as a screw-type extruder by feeding the above composition to the extruder, heating preferably at a temperature of about 80 to 150° C. to free polyamine for the reaction with the isocyanate groups, venting to remove the carbon dioxide gas, and extrusion of the resulting thermoplastic through a suitable die. Similarly, the above composition may be mixed in a suitable conventional mixer, heated while mixing to free polyamine for the reaction with the isocyanate groups, after which the plastic is removed from the mixer and sheeted under compression on a rubber mill or other suitable roller apparatus.

Organic polyisocyanates which may be employed in the compositions of the present invention include aromatic, aliphatic, and cycloaliphatic polyisocyanates and combinations thereof. Representative of these types are the diisocyanates such as m-phenylene diisocyanate, toluene-2,4-diisocyanate, hexamethylene-1,6-diisocyanate, tetramethylene-1,4-diisocyanate, cyclohexane-1,4-diisocyanate, naphthylene-1,5-diisocyanate, 1 - methoxyphenyl-2,4-diisocyanate, diphenylmethane-4,4'-diisocyanate, 4,4'-biphenylene diisocyanate, 3,3'-dimethoxy - 4,4' - biphenyl diisocyanate, 3,3'-dimethyl - 4,4' - biphenyl diisocyanate, and 3,3'-dimethyl - diphenylmethane-4,4'-diisocyanate; the triisocyanates such as 4,4',4"-triphenylmethane diisocyanate, polymethylene polyphenyl isocyanate and toluene 2,4,6-triisocyanate; and the tetraisocyanates such as 4,4'-dimethyldiphenylmethane 2,2',5,5'-tetraisocyanate. Especially useful due to their availability and properties are toluene diisocyanate, diphenylmethane-4,4'-diisocyanate and polymethylene polyphenylisocyanate.

Crude polyisocyanate may also be used in the compositions of the present invention, such as crude toluene diisocyanate obtained by the phosgenation of a mixture of toluene diamines or crude diphenylmethane isocyanate obtained by the phosgenation of crude diphenylmethyl diamine. The preferred unreacted or crude isocyanates are disclosed in U.S. Pat. No. 3,215,652.

Numerous organic compounds containing at least two active hydroxyl groups may be employed in the compositions of the present invention. Examples of suitable types of organic compounds containing at least two active hydroxyl groups which are reactive with an isocyanate group are hydroxyl-containing polyesters, polyalkylene, polyether polyols, hydroxy-terminated polyurethane polymers, polyhydric polythioethers, alkylene oxide adducts of acids of phosphorus, polyacetals, aliphatic polyols, as well as mixtures thereof. Compounds which contain at least one hydroxyl group and one other NCO-reactive group may also be used in accordance with the present invention such as, for example, amino alcohols which contain an amino group and a hydroxyl group. Also, compounds may be used which contain one —SH group and one —OH group.

Any suitable hydroxyl-containing polyester may be used such as are obtained, for example, from polycarboxylic acids and polyhydric alcohols. Any suitable polycarboxylic acid may be used such as oxalic acid, malonic, acid, succinic acid, glutaric acid, adipic acid, pimelic acid, suberic acid, azelaic acid, sebacic acd, brassylic acid, thapsic acid, maleic acid, fumaric acid, glutaconic acid, alpha-hydromuconic acid, beta-hydromuconic acid, alpha-butyl-alpha-ethyl-glutaric acid, alpha-beta-diethyl-succinic acid, isophthalic acid, terephthalic acid, hemimellitic acid, and 1,4-cyclohexene-dicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1 - trimethylolpropane, 1,1,1 - trimethylolethane, hexane-1,2,6-triol, alpha-methyl glycoside, pentaerythritol, and sorbitol. Also included within the term "polyhydric alcohol" are compounds derived from phenol such as 2,2 - (4,4' - hydroxyphenyl)propane, commonly known as bisphenol A.

Any suitable polyalkylene polyether polyol may be used such as the polymerization product of an alkylene oxide or of a mixture of alkylene oxides with a polyhydric alcohol. Any suitable polyhydric alcohol may be used such as those disclosed above for use in the the praparation of the hydroxyl-containing polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols and polybutylene ether glycols. The polyalkylene polyether polyols may be prepared by any known process such as, for example, the process disclosed by Wurtz in 1859 and Encyclopedia of Chemical Technology, vol. 7, pp. 257–262, published by Interscience Publishers, Inc. (1951) or in U.S. Pat. No. 1,922,459. Polyethers which are preferred include the alkylene oxide addition products of trimethylolpropane, glycerol, pentaerythritol, propylene glycol and 2,2-(4,4'-hydroxyphenyl)-propane.

Any suitable polyhydric polythioether may be used such as, for example, the condensation product of thiodiglycol or the reaction product of a dihydric alcohol such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Alkylene oxide adducts of acids of phosphorus which may be used include those neutral adducts prepared from the alkylene oxides disclosed above for use in the praparation of polyalkylene polyether polyols. Acids of phosphorus which may be used are acids having a $P_2O_5$ equivalency of from about 72% to about 95%. The phosphoric acids are preferred.

Any suitable polyacetal may be used such as, for example, the reaction product of formaldehyde or other suitable aldehyde with a dihydric alcohol or an alkylene oxide such as those disclosed above.

Other compounds which do not necessarily fit within any of the previously set forth classes of compounds which are quite suitable in the compositions of the present invention include the hydroxy-terminated polyurethane polymers such as a hydroxy-terminated polymer made by reacting an isocyanate with several moles of an alkylene glycol.

The amounts of organic polyisocyanates and organic compounds containing at least two active hydroxyl groups which are employed in the preparation of the compositions of the present invention are such that an excess of isocyanate groups are present. Stated otherwise, the NCO/OH ratio of the compositions is greater than one. This is, of course, necessary if polyurethane-ureas are to be prepared since unreacted isocyanate groups must be available for reaction with the polyamines.

Various polyamine carbamates may be employed in the compositions of the present invention. They are generally prepared by the reaction of carbon dioxide or a compound which liberates carbon dioxide with a polyamine containing at least two amino-nitrogens. Representative polyamines include aliphatic polyamines such as ethylene diamine, propylene diamine, diethylene triamine, dipropylene triamine, triethylene tetramine, tripropylene tetramine, hexamethylene diamine, and tetraethylene pentamine; aromatic polyamines such as p-aminoaniline, 1,5-secondary diaminonaphthalene, and 2,4-secondary diamino-tolylene; heterocyclic polyamines such as piperazine, 2-methylpiperazine, hydrogenated diazines and alicyclic polyamines such as 1,4-cyclohexane-bis(methylamine). Mixtures of any of the above may also be used. The amount of polyamine carbamate employed in the compositions of the present invention should be such that the total $NCO/(OH+NH_2)$ ratio is from 0.8:1 to 1.5:1, preferably from 0.9:1 to 1.2:1.

In addition to the above described compositions, a wide range of additives may be added to the composition of the present invention. These additives include catalysts, emulsifiers, fillers, and extenders.

The following examples serve to illustrate the invention. All parts are by weight unless otherwise stated.

EXAMPLES

Various isocyanate-terminated intermediates (commonly known as "prepolymers") prepared by the reaction of organic polyisocyanates with polyether polyols were prepared for use in the compositions in the present invention. The prepolymers prepared were as follows:

Prepolymer A.—2400 parts of a blend of a 1300 molecular weight polypropylene glycol and a 750 molecular weight polypropylene glycol (average molecular weight of 1200) was allowed to react with 696 parts of tolylene diisocyanate for three hours at 80°. The resulting prepolymer contained an unreacted NCO content of 4.7%.

Prepolymer B.—2000 parts of a 2000 molecular weight polypropylene glycol was allowed to react with 348 parts of tolylene diisocyanate for three hours at 80° C. The resulting prepolymer contained an unreacted NCO content of 3.65%.

Prepolymer C.—3150 parts of a 1575 molecular weight polyol prepared from trimethylolpropane and propylene oxide was allowed to react with 1044 parts of tolylene diisocyanate for three hours at 80° C. The resulting prepolymer contained an unreacted NCO content of 5.93%.

Prepolymer D.—2220 parts of a 740 molecular weight polyol prepared from trimethylolpropane and propylene oxide was allowed to react with 1566 parts of tolylene diisocyanate for three hours at 80° C. The resulting prepolymer contained an unreacted NCO content of 9.7%.

Prepolymer E.—Substantially the same as Prepolymer A with the exception that the resulting prepolymer contained an unreacted NCO content of 5.26%.

Prepolymer F.—3200 parts of a 6000 molecular weight polyethylene glycol was allowed to react with 148 parts of tolylene diisocyanate for 0.5 hour at 80° C. The resulting prepolymer contained an unreacted NCO content of 0.79%.

EXAMPLE I

A foamable polyurethane-urea composition was prepared by adding two parts of 2-methylpiperazine carbamate to 25 parts of Prepolymer A. A viscous, white mixture resulted which was divided into two equal portions. The stability of the composition at room temperature and at 50° C. was then tested in the following manner. One portion of the composition was first divided into two equal portions. The portion evaluated at room temperature was diluted with 50% by weight of toluene. The viscosity of the diluted composition was tested initially and thereafter at 24-hour intervals. Initial Gardner reading recorded A, as did all readings taken thereafter. The portion evaluated at 50° C. was simply placed in an oven. No appreciable viscosity change in the viscous, dough-like material was observed after 48 hours.

The other portion of the original mixture was placed in a mold and heated to 150° C. for eight minutes. A spongy foam resulted. Five-part samples of the foam were then added to 95 parts of dimethylformamide and to 95 parts of dimethylsulfoxide. The foam did not dissolve in either polar solvent. This indicates that both foaming and chain extending occurred.

Thus, this example illustrates a unitary, foamable polyurethane-urea composition which is extremely stable at room temperature, at 50° C., and upon application of heat thereto could be readily chain-extended and foamed.

EXAMPLE II

Two foamable polyurethane-urea compositions were prepared from 25 parts of Prepolymer B and (a) 1.7 parts of hexamethylenediamine carbamate and (b) 1.1 parts of ethylenediamine carbamate. The stability of the compositions was tested as described in Example I. Both compositions were light tan in color and recorded a Gardner reading of A initially and at 24-hour intervals thereafter. At 50° C. neither composition underwent any appreciable viscosity change. Foams were prepared from these compositions by heating them in a mold at 150° C. to 155° C. for about ten minutes. Flexible foams resulted which were insoluble in both dimethylformamide and dimethylsulfoxide.

EXAMPLE III

Two foamable polyurethane-urea compositions were prepared from 25 parts of Prepolymer C and (a) 1.8 parts of ethylenediamine carbamate and (b) 2.5 parts of 2-methylpiperazine carbamate. The stability of the compositions was tested as described in Example I. Both compositions were white in color and recorded a Gardner reading of G initially and at 24-hour intervals thereafter. At 50° C. neither composition underwent any appreciable viscosity change. Foams were prepared from these compositions by heating them in a mold at 150° C. to 155° C. for about five minutes. Flexible foams resulted which were insoluble in both dimethylformamide and dimethylsulfoxide.

EXAMPLE VI

Two polyurethane-urea compositions were prepared from 25 parts of Prepolymer D and (a) 4 parts of 1,4-cyclohexane-bis(methylamine) carbamate and (b) 4.1 parts of 2-methylpiperazine carbamate. The stability of the compositions was tested as described in Example I. Both compositions were white in color and recorded a Gardner reading of J initially and at 24-hour intervals thereafter. At 50° C. neither composition underwent any appreciable viscosity change. Foams were prepared from these compossitions by heating them in a mold at 150° C. to 155° C. for about ten minutes. Flexible foams resulted which were insoluble in both dimethylformamide and dimethylsulfoxide.

EXAMPLE V

A stable foamable polyurethane-urea composition was prepared by combining the following:

100 parts of a polyether polyol having a molecular weight of about 16,800 prepared from sucrose and propylene oxide (OH No. 26.7),
8.3 parts of tolylene diisocyanate and
6.86 parts of 2-methylpiperazine carbamate.

A light yellow paste was obtained, a portion of which was stored to determine the stability of the composition at room temperature. After twelve hours, only a slight increase in viscosity was observed. The remaining portion of the composition was heated to about 150° C. at which temperature the composition became fluid and carbon dioxide evolution was observed. Shortly thereafter, a flexible foam was formed which was insoluble in both dimethylsulfoxide and dimethylformamide.

EXAMPLE VI

A thermoplastic polyurethane-urea composition was prepared by introducing about 100 parts of Prepolymer E which contained as a slurry 9.0 parts of 2-methylpiperazine carbamate into the hopper of a single screw low-compression, table model laboratory plastic extruder, manufactured by the Wayne Machine & Die Company of 100 Furler Street, Totowa, N.J., having an L/D ratio of 20:1, a screw diameter of ¾" and screw speeds of 50 to 80 r.p.m. The extruder was heated by electrical resistance heaters whereby the stock was maintained at a temperature of 290° F. to 300° F. The hold-up time in the extruder was three to five minutes. The carbamate-prepolymer mixture was found to be stable at room temperature. An extrudate was discharged from the extruder which upon cooling was elastomeric, solid, and non-tacky.

EXAMPLE VIII

A thermoplastic polyurethane-urea composition was prepared by mixing 1110 parts of Prepolymer F with 100 parts of finely powdered 2-methylpiperazine carbamate in a mechanical mixer and steam heat applied to the mixer. Foaming arising from the decomposition of the diamine carbamate was observed starting at about 235° F., accompanied by an exotherm causing the temperature to increase to approximately 300° F. The steam heat was turned off and cooling introduced, the reaction mixture being maintained at 260° F. to 290° F. for about eight minutes. After the temperature had been permitted to drop to 160° F., the elastomeric plastic was removed and sheeted on a rubber mill, where it was compression molded to approximately 70 mils thickness. The physical properties of the elastomeric urethane thermoplastic are set forth in Table I below.

TABLE I—PHYSICAL PROPERTIES

| | |
|---|---|
| Tensile strength, p.s.i. | 2477 |
| Elongation, percent | 632 |
| Elongation set, percent | 19 |
| Shore A hardness | 73–65 |
| Bayshore resilience, percent | 27 |
| 300% modulus, p.s.i. | 983 |
| 100% modulus, p.s.i. | 407 |

EXAMPLE VIII

A thermoplastic polyurethane-urea composition was prepared by mixing 0.14 part of 2-methylpiperazine carbamate with 15.5 parts of Prepolymer F in a beaker at 70° C. After thoroughly mixing, i.e., 10 minutes, the resulting paste remained at or below 70° C. and could be easily poured from a beaker one hour after mixing. The paste, which was formed in this manner, was fed to the extruder of Example VI. However, in the instant example, the extruder was employed for extruding films The polymer was extruded with three different sets of front and back temperatures, set forth in Table II below, with the physical data on films extruded from the extruder.

TABLE II.—PHYSICAL PROPERTIES

| Temperature, °C.: | | | |
|---|---|---|---|
| Front | 275 | 300 | 300 |
| Back | 275 | 350 | 300 |
| Tensile, p.s.i. | 5,565 | 4,450 | 4,166 |
| 500% modulus, p.s.i. | 2,975 | 1,920 | 1,68 |
| Yield point, p.s.i. | 2,340 | 1,445 | 1,417 |
| Elongation, percent | 1,188 | 587 | 813 |

While there has been shown and described hereinabove the present preferred embodiments of this invention, it is to be understood that various changes, alterations, and modifications can be made thereto without departing from the spirit and scope thereof as defined in the appended claims.

What is claimed is:

1. A process for the preparation of a thermoplastic polyurethane-urea which comprises adding a polyamine carbamate to:
   1. (a) organic polyisocyanate and
      (b) organic compounds containing at least two active hydroxyl groups, the amounts of (a) and (b) being such that the NCO/OH ratio of the composition is greater than one or
   2. isocyanate-terminated intermediate prepared by the reaction of (a) and (b), heating the addition product to a temperature of from about 80° C. to 150° C. and extruding the heated product to product a solid thermoplastic polyurethane-urea product.

2. The process of claim 1 wherein said organic compound is a polyether polyol prepared by the condensation of an alkylene oxide with a polyhydric alcohol.

3. The process of claim 2 wherein the polyamine carbamate is selected from the group consisting of 2-methylpiperazine carbamate, ethylenediamine carbamate, and hexamethylenediamine carbamate.

4. The process of claim 3 wherein said organic polyisocyanate is tolylene diisocyanate.

References Cited

UNITED STATES PATENTS

| | | | |
|---|---|---|---|
| Re. 24,514 | 8/1958 | Hoppe et al. | 260—2.5 |
| 2,957,207 | 10/1960 | Roop et al. | 18—57 |
| 3,108,976 | 10/1963 | Knox | 260—2.5 |
| 3,125,617 | 3/1964 | Hoppe | 264—54 |
| 3,233,025 | 2/1966 | Frye et al. | 264—176 |
| 3,256,213 | 6/1966 | Gmitter et al. | 260—2.5 |
| 3,280,048 | 10/1966 | Griffin et al. | 260—2.5 |
| 3,391,094 | 7/1968 | Childers | 260—2.5 |
| 3,424,645 | 1/1969 | Ohsol | 161—175 |
| 3,425,964 | 2/1969 | Stanley | 260—2.5 |
| 3,499,872 | 3/1970 | Thoma et al. | 260—75 |
| 3,214,290 | 10/1965 | Larner et al. | 117—135.5 |

OTHER REFERENCES

Khatchalski et al., Journ. Am. Chem. Soc. vol. 73, (April 1951) pp. 1829–1831.

DONALD E. CZAJA, Primary Examiner

H. S. COCKERAM, Assistant Examiner

U.S. Cl. X.R.

260—2.5 AM, 67 N, 77.5 AM, 77.5 AQ; 264—54